US009104496B2

(12) United States Patent
Jacobs et al.

(10) Patent No.: US 9,104,496 B2
(45) Date of Patent: *Aug. 11, 2015

(54) SUBMITTING OPERATIONS TO A SHARED RESOURCE BASED ON BUSY-TO-SUCCESS RATIOS

(71) Applicant: International Business Machines Corporation, Armonk, NY (US)

(72) Inventors: Stuart Z. Jacobs, Lakeville, MN (US); Andrew T. Koch, Rochester, MN (US); David A. Larson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 326 days.

This patent is subject to a terminal disclaimer.

(21) Appl. No.: 13/837,113

(22) Filed: Mar. 15, 2013

(65) Prior Publication Data
US 2014/0115600 A1 Apr. 24, 2014

Related U.S. Application Data

(63) Continuation of application No. 13/804,459, filed on Mar. 14, 2013.

(60) Provisional application No. 61/716,127, filed on Oct. 19, 2012.

(51) Int. Cl.
G06F 9/455 (2006.01)
G06F 9/46 (2006.01)
G06F 9/50 (2006.01)
G06F 9/48 (2006.01)

(52) U.S. Cl.
CPC ............ G06F 9/5077 (2013.01); G06F 9/4887 (2013.01); G06F 9/50 (2013.01); G06F 2209/504 (2013.01); Y02B 60/142 (2013.01)

(58) Field of Classification Search
None
See application file for complete search history.

(56) References Cited

U.S. PATENT DOCUMENTS 5,519,641 A * 5/1996 Beers et al. .................. 709/208
7,231,455 B2 * 6/2007 Marejka et al. .............. 709/233
(Continued)

OTHER PUBLICATIONS

Wasicek et al., A System-on-a-Chip Platform for Mixed-Criticality Applicaion, 13th IEEE Symposium on Object/Component/Service-Oriented Real-Time Distributed Computing, May 2010.*
Grot et al., "KiL—NOC: A Heterogeneous Network-on-Chip Architecture for Scalability and Service Guarantees", ISCA '11, Jun. 2011.*
(Continued)

Primary Examiner — Lewis A Bullock, Jr.
Assistant Examiner — Kevin X Lu
(74) Attorney, Agent, or Firm — Owen J. Gamon

(57) ABSTRACT

In an embodiment, an average busy-to-success ratio is calculated for partitions that submitted operations to a shared resource during a first time period. A first busy-to-success ratio for a first partition during the first time period is calculated. If the first busy-to-success ratio is greater than the average busy-to-success ratio and a difference between the first busy-to-success ratio and the average busy-to-success ratio is greater than a threshold amount, a throttle amount for the first partition is increased. A first operation from the first partition during a first time subdivision of a second time period is received. If a number of operations received from the first partition during the first time subdivision of the second time period is greater than the throttle amount for the first partition, a busy indication is returned to the first partition and the first operation is not submitted to the shared resource.

13 Claims, 5 Drawing Sheets

(56) References Cited

U.S. PATENT DOCUMENTS

| | | | |
|---|---|---|---|
| 8,738,972 B1* | 5/2014 | Bakman et al. | 714/47.2 |
| 2009/0307436 A1* | 12/2009 | Larson et al. | 711/148 |
| 2011/0225299 A1* | 9/2011 | Nathuji et al. | 709/226 |
| 2012/0096458 A1* | 4/2012 | Huang et al. | 718/1 |
| 2013/0054813 A1* | 2/2013 | Bercovici et al. | 709/226 |
| 2014/0007097 A1* | 1/2014 | Chin et al. | 718/1 |

OTHER PUBLICATIONS

Wasicek et al., "A System-on-a-Chip Platform for Mixed-Criticality Applications," 13th IEEE Symposium on Object/Component/Service-Oriented Real-Time Distributed Computing, May 2010.

Grot et al., "Kilo—NOC: A Heterogeneous Network-on-Chip Architecture for Scalability and Service Guarantees," ISCA '11, Jun. 2011.

* cited by examiner

SUBMITTING OPERATIONS TO A SHARED RESOURCE BASED ON BUSY-TO-SUCCESS RATIOS

CROSS-REFERENCE TO RELATED APPLICATIONS

This application is a continuation of pending U.S. patent application Ser. No. 13/804,459, filed Mar. 14, 2013, entitled "SUBMITTING OPERATIONS TO A SHARED RESOURCE BASED ON BUSY-TO-SUCCESS RATIOS," which is a non-provisional application of, and which claims the benefit of U.S. Provisional Application Ser. No. 61/716,127, filed Oct. 19, 2012, entitled "PROVIDING FOR ACCESS FAIRNESS BETWEEN PARTITIONS USING A SHARED RESOURCE," and incorporated by reference herein in their entirety.

FIELD

An embodiment of the invention generally relates to computer systems and more particularly to a computer system that provides for fairness of access to shared resources by partitions.

BACKGROUND

Computer systems typically comprise a combination of hardware, such as semiconductors, transistors, chips, and circuit boards, and computer programs. As increasing numbers of smaller and faster transistors can be integrated on a single chip, new processors are designed to use these transistors effectively to increase performance. Currently, many computer designers opt to use the increasing transistor budget to build ever bigger and more complex uni-processors. Alternatively, multiple smaller processor cores can be placed on a single chip, which is beneficial because a single, simple processor core is less complex to design and verify. This results in a less costly and complex verification process, as a once verified module, the processor, is repeated multiple times on a chip.

Techniques known as multiple logical partitions take advantage of multi-processors. A logically partitioned computer comprises multiple logical partitions that implement virtual computers, which execute in separate memory spaces, may execute separate operating systems, and may use shared resources. Examples of shared resources are processors, memory, co-processors, network bandwidth, or secondary storage. Partitions are often implemented on computer systems that include multiple processors and/or on multiple computer systems (often called compute nodes or simply nodes) that comprise processors, which run the multiple partitions to accomplish tasks.

SUMMARY

A computer-readable storage medium and computer system are provided. In an embodiment, an average busy-to-success ratio is calculated for a plurality of partitions that submitted a plurality of operations to a shared resource during a first time period. A first busy-to-success ratio for a first partition of the plurality of partitions during the first time period is calculated. If the first busy-to-success ratio for the first partition is greater than the average busy-to-success ratio for the plurality of partitions and a difference between the first busy-to-success ratio for the first partition and the average busy-to-success ratio for the plurality of partitions is greater than a threshold amount, a throttle amount for the first partition is increased. A first operation from the first partition during a first time subdivision of a second time period is received. If a number of operations received from the first partition during the first time subdivision of the second time period is greater than the throttle amount for the first partition, a busy indication is returned to the first partition and the first operation is not submitted to the shared resource.

Figure 1:
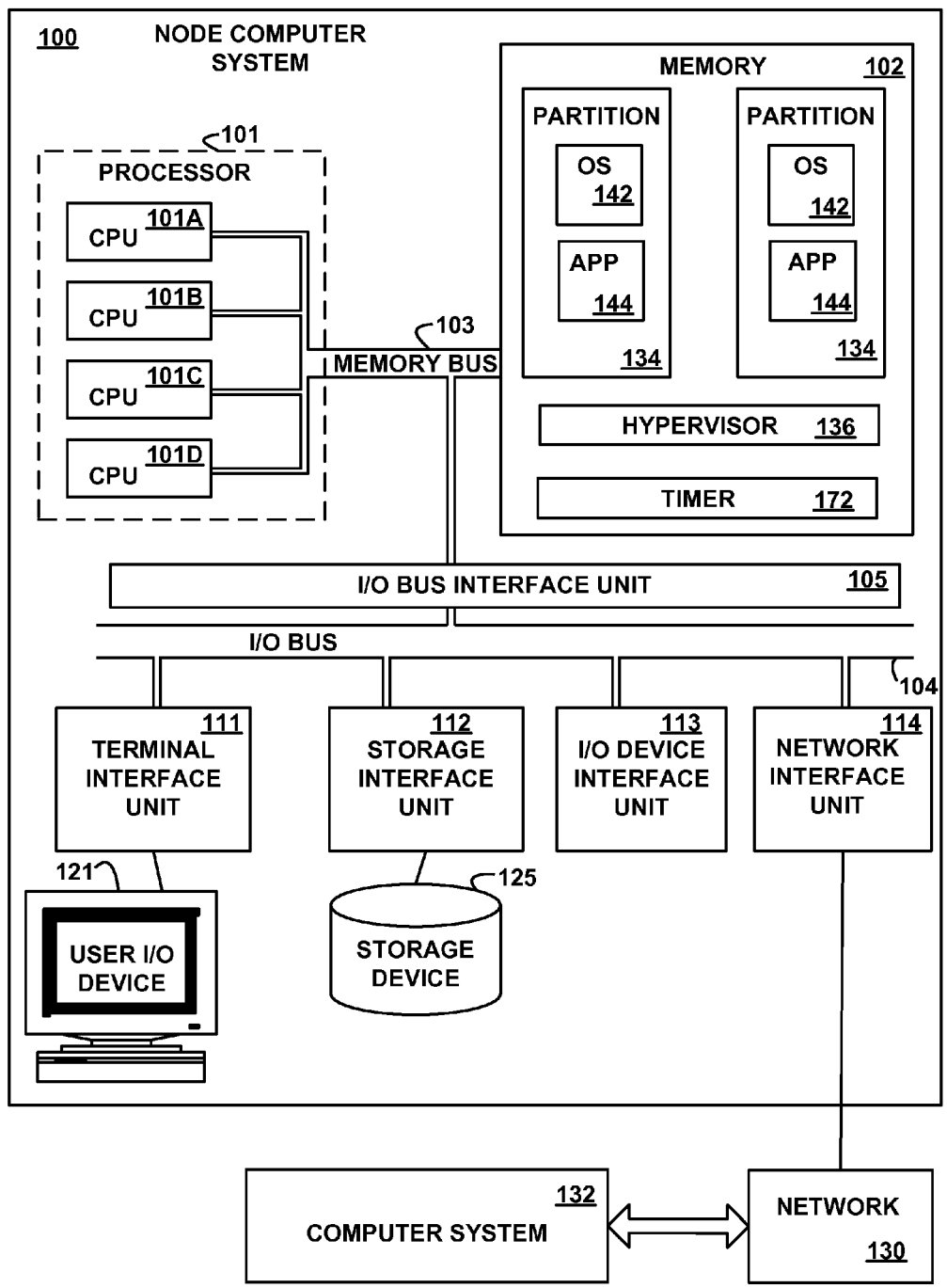
FIG. 1 depicts a high-level block diagram of an example system for implementing an embodiment of the invention.

It is to be noted, however, that the appended drawings illustrate only example embodiments of the invention, and are therefore not considered a limitation of the scope of other embodiments of the invention.

DETAILED DESCRIPTION

In an embodiment, a hypervisor allocates a shared resource to a set of logical partitions. The shared resource is accessed via the hypervisor in order to perform operations on behalf of the logical partitions. The capacity of the shared resource is represented by a set of operations that are available to the set of logical partitions that share the resource. For a given time period, the hypervisor tracks all operations from a logical partition to the shared resource, along with the outcome of that operation, whether the operation is successful or the shared resource is busy and unable to perform the operation. After the time period expires, lapses, or ends, the hypervisor examines the operations, and the hypervisor increases or decreases the throttle amount of the logical partitions based on the usage of the shared resource for the time period.

After each time period, the hypervisor calculates a busy-to-success ratio for each logical partition that submitted operations to the shared resource during the time period. If the logical partition submitted only operations to a shared resource that was busy during the time period, then the hypervisor gives the logical partition the maximum busy-to-success ratio possible, giving the logical partition more favor during the average ratio calculation. Then, the hypervisor calculates the average busy-to-success ratio of all the logical partitions that submitted operations to the shared resource during the time period.

For each logical partition, if that partition submitted no operations during the time period, and the logical partition usage of the shared resource was previously throttled, the hypervisor reduces the throttle amount for that partition by a back off amount. If the partition submitted any operation to the shared resource during the time period, then the hypervisor calculates the difference between the busy-to-success ratio for that partition from the average busy-to-success ratio. If the absolute difference between the busy-to-success ration of the partition and the average busy-to-success ratio for all partitions to the shared resource is larger than a threshold, then the hypervisor adjusts the throttle amount for the partition by a back off amount. If the busy-to-success ratio for the partition is higher than the average busy-to-success ratio, then the hypervisor decreases the throttle amount for the partition. If the throttle amount is lower than the average, then the hypervisor increases the throttle amount incrementally to a maximum throttle amount. In an embodiment, the hypervisor increases the throttle amount incrementally by one. In another embodiment, the hypervisor increases the throttle amount in proportion to the difference between the busy-to-success ratio for the partition and the average busy-to-success ratio for all partitions. In an embodiment, the hypervisor decreases the throttle amount for the partition in proportion to the difference between the average busy-to-success ratio for all partitions and the busy-to-success ratio for the partition. If all the logical partitions that had operations are under the threshold, then the hypervisor reduces the throttle amount by a back off amount for all logical partitions that are currently throttled. In various embodiments, the hypervisor receives the back off amount, various thresholds, and the maximum throttle amount from a designer of the hypervisor, from a user I/O (Input/Output) device, or from the partition.

In various embodiments, the throttle amount for a partition is the number of operations that the hypervisor allows the partition to submit to the shared resource during the next time period or in each time subdivision of the next time period. The hypervisor may evenly distribute the number of operations that the hypervisor allows the partition to submit to the shared resource, in the next time period, by dividing the time period into smaller time subdivisions that have an allowed number of operations per subdivision. The hypervisor increases and decreases these numbers based on the throttle amount increasing or decreasing.

If during the given time period, the logical partition is throttled (has a throttle amount) and the logical partition submits an operation to the shared resource, then the hypervisor determines whether the logical partition has operations available for that subdivision (determines whether the number of operations successfully submitted by the partition to the shared resource during the time period or the time subdivision is less than the throttle amount). If so, the hypervisor allows the operation to be submitted to the shared resource. If that operation succeeds, then the hypervisor reduces the number of operations available for that subdivision by one (the hypervisor increases the count of the number of operations that successfully occurred during that time subdivision by one). If the shared resource is busy, then the hypervisor does not change the number of operations available for that subdivision. If the partition has no available operations in a subdivision, the hypervisor returns a busy return code to the logical partition, without submitting the operation to the shared resource or recording a busy operation for the time period for the logical partition. Each time the partition attempts to submit an operation, the hypervisor checks the time subdivision, and if the current time is past the last subdivision time, the hypervisor resets the number of available operations based on the throttle amount for that partition.

The hypervisor uses the throttle amount to determine the capacity in a time period. The hypervisor determines the capacity for the next period using the last time period's number of successful operations, dividing that value by the new throttle amount. For example, if one hundred successful operations occurred in the last time period and the throttle amount is now 40 (or a throttle rate is 40%), then the hypervisor now allows the logical partition only 60 possible successful operations in the next time period, reducing the number of potential operation successes by 40. Next, the hypervisor subdivides the new capacity for that logical partition as evenly as possible across the next time period into the individual subdivisions of the time periods. The capacity for the time subdivisions is then used for the next time period to throttle the operations to the shared resource. Using the above example, if the next time period has four time subdivisions, then the throttle amount for each time subdivision is 40/4=10 operations are allowed to be submitted by the partition to the shared resource during each time subdivision. In various embodiments, the hypervisor receives the number of time subdivisions in a time period from a designer of the hypervisor, from a user I/O device, or from the partition.

A previously un-throttled logical partition may start using the shared resource during a time period in which other logical partitions are throttled. This may cause a temporary condition, in which logical partitions with allowed operations during a time tracking period may not be able to use the shared resource. The hypervisor tracks the usage of every partition, and at the end of the time period, the hypervisor recalculates the throttling, using all of the usage across that time period. This means that the hypervisor sizes the time period appropriately, in order to mitigate the effect of the previously un-throttled logical partition.

The hypervisor may dynamically change the time period based on historical usage of the logical partitions for the shared resource. In this way, the hypervisor shortens the time period when the shared resource encounters a large number of busy operations during the current time period. After the activity lessens, the hypervisor gradually lengthens the time period. In the same way, if little activity occurs, then the hypervisor lengthens the time period, in order to mitigate the number of times the hypervisor must recalculate the throttling.

Referring to the Drawings, wherein like numbers denote like parts throughout the several views, FIG. 1 depicts a high-level block diagram representation of a node computer system 100 connected to a computer system 132 via a network 130, according to an embodiment of the present invention. The mechanisms and apparatus of embodiments of the present invention apply equally to any appropriate computing system.

The major components of the node computer system 100 comprise one or more processors 101, memory 102, a terminal interface unit 111, a storage interface unit 112, an I/O (Input/Output) device interface unit 113, and a network interface unit 114, all of which are communicatively coupled, directly or indirectly, for inter-component communication via a memory bus 103, an I/O bus 104, and an I/O bus interface unit 105.

The node computer system 100 contains one or more general-purpose programmable central processing units (CPUs) 101A, 101B, 101C, and 101D, herein generically referred to as the processor 101. In an embodiment, the node computer system 100 contains multiple processors typical of a relatively large system; however, in another embodiment the node computer system 100 may alternatively be a single CPU system. Each processor 101 executes instructions stored in the memory 102 and may comprise one or more levels of on-board cache.

In an embodiment, the memory 102 may comprise a random-access semiconductor memory, storage device, or storage medium (either volatile or non-volatile) for storing or encoding data and programs. In another embodiment, the memory 102 represents the entire virtual memory of the node computer system 100, and may also include the virtual memory of other computer systems coupled to the node computer system 100 or connected via the network 130. The memory 102 is conceptually a single monolithic entity, but in other embodiments the memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 is illustrated as comprising the primary components utilized in implementing a logically partitioned computing environment on the node computer system 100, including a plurality of logical partitions 134 managed by a partition manager or hypervisor 136. Although the partitions 134 and the hypervisor 136 are illustrated as being contained within the memory 102 in the node computer system 100, in other embodiments some or all of them may be on different computer systems, e.g., the computer system 132, and may be accessed remotely, e.g., via the network 130. Further, the node computer system 100 may use virtual addressing mechanisms that allow the programs of the node computer system 100 to behave as if they only have access to a large, single storage entity instead of access to multiple, smaller storage entities. Thus, while the partitions 134 and the hypervisor 136 are illustrated as residing in the memory 102, these elements are not necessarily all completely contained in the same storage device at the same time.

Each of the logical partitions 134 comprises and utilizes an OS (operating system) 142, which controls the primary operations of the logical partition 134 in the same manner as the operating system of a non-partitioned computer. Some or all of the operating systems 142 may be the same or different from each other. Any number of logical partitions 134 may be supported, and the number of the logical partitions 134 resident at any time in the node computer system 100 may change dynamically as partitions 134 are added or removed from the node computer system 100.

Each of the logical partition 134 comprises instructions that execute on the processor 101 in a separate, or independent, memory space, and thus each logical partition 134 acts much the same as an independent, non-partitioned computer from the perspective of each application (app) 144 that executes in each such logical partition. As such, the applications 144 typically do not require any special configuration for use in a partitioned environment. In various embodiments, the application 144 is a user application, a third-party application, or any portion, multiple, or combination thereof. The application 144 comprises instructions that execute on the processor 101 or statements that are interpreted by instructions that execute on the processor 101. Each of the applications 144 may be the same or different from each other.

Given the nature of logical partitions 134 as separate virtual computers, it may be desirable to support inter-partition communication to permit the logical partitions 134 to communicate with one another as if the logical partitions 134 were on separate physical machines. As such, in some implementations it may be desirable to support an unillustrated virtual local area network (LAN) adapter associated with the hypervisor 136 to permit the logical partitions 134 to communicate with one another via a networking protocol. In another embodiment, the virtual network adapter may bridge to a physical adapter, such as the network interface unit 114. Other manners of supporting communication between partitions 134 may also be supported consistent with embodiments of the invention.

Although the hypervisor 136 is illustrated as being within the memory 102, in other embodiments, all or a portion of the hypervisor 136 may be implemented in firmware or hardware. The hypervisor 136 may perform both low-level partition management functions, such as page table management and may also perform higher-level partition management functions, such as creating and deleting the partitions 134, concurrent I/O maintenance, and allocating/deallocating shared resources, such as processors, memory, the terminal interface unit 111, the storage interface unit 112, the I/O device interface unit 113, the network interface unit 114, the user I/O device 121, the storage device 125 and other shared hardware or program resources to/from the various partitions 134. The hypervisor 136 controls the allocation of the shared resources to the partitions 134 and the access of the shared resources by the partitions 134, ensuring security and isolation of these partitions 134 within the node computer system 100. The hypervisor 136 presents the shared resources to the partitions 134 as standalone resources, so that each of the partitions 134 believe that they are the sole owner of the resource. In an embodiment, a shared resource has a limited capacity to perform the operations of which it is requested. For example, a coprocessor only has a limited queue depth for performing operations. Thus, the hypervisor 136 governs fairness between multiple partitions 134 that utilize the shared resource.

The hypervisor 136 statically and/or dynamically allocates to each logical partition 134 a portion of the available resources in the node computer system 100. For example, each logical partition 134 may be allocated one or more of the processors 101 and/or one or more hardware threads on which to execute, as well as a portion of the available memory space to access. The logical partitions 134 can share specific program and/or hardware resources such as the processors 101, such that a given resource may be utilized by more than one logical partition 134. In the alternative, program and hardware resources may be allocated to only one logical partition 134 at a time. Additional resources, e.g., mass storage, backup storage, user input, network connections, and the I/O adapters therefor, are typically allocated to one or more of the logical partitions 134. Resources may be allocated in a number of manners, e.g., on a bus-by-bus basis, or on a resource-by-resource basis, with multiple logical partitions 134 sharing resources on the same bus. Some resources may be allocated to multiple logical partitions 134 at a time. The resources identified herein are examples only, and any appropriate resource capable of being allocated may be used.

In an embodiment, the partitions 134 and/or the hypervisor 136 comprise instructions that execute on the processor 101 or statements that are interpreted by instructions executing on the processor 101 to perform the functions as further described below with reference to FIGS. 2, 3, 4, and 5. In another embodiment, the partitions 134 and/or the hypervisor 136 may be implemented in microcode or firmware. In another embodiment, the hypervisor 136 may be implemented in hardware via logic gates, semiconductor devices, chips, circuits, circuit cards, and/or other physical hardware devices.

The memory 102 further comprises a timer 172. The timer 172 may be initialized to a specified starting value, threshold, or time period value, and count down to zero, at which time the timer 172 interrupts the hypervisor 136. In another embodiment, the timer 172 may be initialized to zero and count up to either a specified threshold or time period value or indefinitely until the timer 172 is reset. Regardless of whether the timer 172 counts up or down, the current value (the current count or time) of the timer 172 may be read and set by the hypervisor 136. Multiple instances of the timer 172 may time different events and may be referred to with different names. Although the timer 172 is illustrated as being a software timer included within the memory 102, in another embodiment, the timer 172 may be a hardware timer.

The memory bus 103 provides a data communication path or communications fabric for transferring data among the processor 101, the memory 102, and the I/O bus interface unit 105. Although only one node computer system 100 is illustrated in FIG. 1, multiple nodes may be connected together and may communicate to each other via the memory bus 103 or communications fabric. The I/O bus interface unit 105 is further coupled to the I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the I/O bus 104.

The I/O interface units support communication with a variety of storage and I/O devices. For example, the terminal interface unit 111 supports the attachment of one or more user I/O devices, which may comprise user output devices (such as a video display device, projectors, a speaker, and/or television set) and user input devices (such as a camera, a keyboard, a mouse, a keypad, a touchpad, a trackball, buttons, Radio Frequency Identifier Tags, a light pen, a finger, a stylus, or other pointing device). A user may manipulate the user input devices using a user interface, in order to provide input data and commands to the user I/O device 121 and the node computer system 100, and may receive output data via the user output devices. For example, a user interface may be presented via the user I/O device 121, such as displayed on a display device. The user I/O device 121 may be of any size and may accommodate multiple users viewing and touching the display device simultaneously or collaboratively, and in an embodiment, any user may touch at any location on the display device.

The storage interface unit 112 supports the attachment of one or more disk drives or direct access storage devices 125 (which are typically rotating magnetic disk drive storage devices, although they could alternatively be other storage devices, including arrays of disk drives configured to appear as a single large storage device to a host computer). In another embodiment, the storage device 125 may be implemented via any type of secondary storage device. The contents of the memory 102, or any portion thereof, may be stored to and retrieved from the storage device 125, as needed. The I/O device interface unit 113 provides an interface to any of various other input/output devices or devices of other types, such as printers or fax machines. The network interface unit 114 provides one or more communications paths from the node computer system 100 to other digital devices and computer systems 132; such paths may comprise, e.g., one or more networks 130.

Although the memory bus 103 is shown in FIG. 1 as a relatively simple, single bus structure providing a direct communication path among the processors 101, the memory 102, and the I/O bus interface unit 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 105 and the I/O bus 104 are shown as single respective units, the node computer system 100 may, in fact, contain multiple I/O bus interface units 105 and/or multiple I/O buses 104. While multiple I/O interface units are shown, which separate the I/O bus 104 from various communications paths running to the various I/O devices, in other embodiments some or all of the I/O devices are connected directly to one or more I/O buses.

In various embodiments, the node computer system 100 is a multi-user mainframe computer system, a single-user system, or a server computer or similar device that has little or no direct user interface, but receives requests from other computer systems (clients). In other embodiments, the node computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable bus, network, or any multiple or combination thereof, and may support any appropriate protocol suitable for communication of data and/or code to/from the node computer system 100 and the computer system 132. In various embodiments, the network 130 may represent a storage device or a combination of storage devices, either connected directly or indirectly to the node computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network.

The computer system 132 may comprise some or all of the hardware and/or computer program elements of the node computer system 100.

FIG. 1 is intended to depict the representative major components of the node computer system 100, the network 130, and the computer system 132. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in various memory and storage devices in the node computer system 100 and that, when read and executed by one or more processors in the node computer system 100 or when interpreted by instructions that are executed by one or more processors, cause the node computer system 100 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, non-profit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

Figure 2:
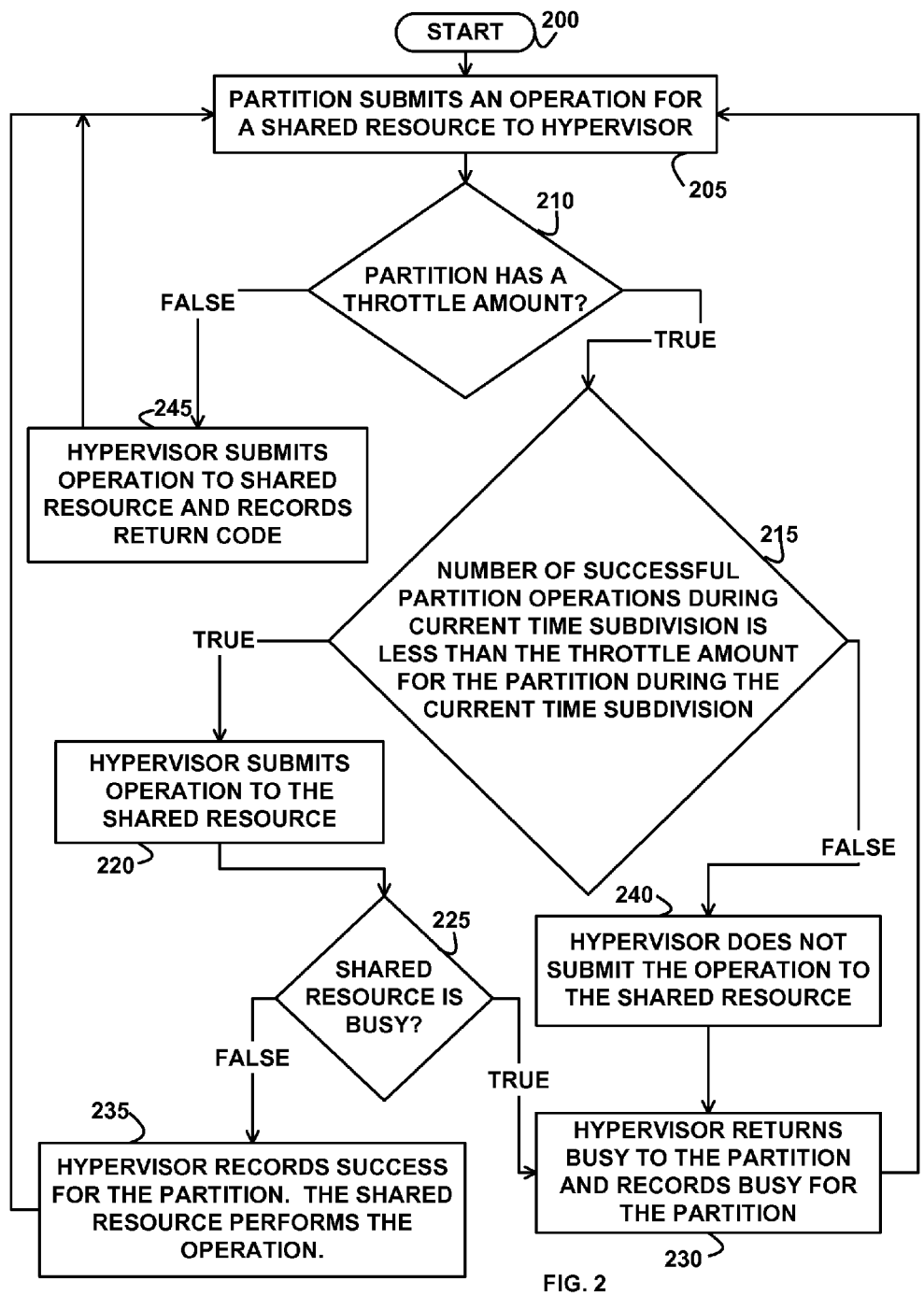
FIG. 2 depicts a flowchart of example processing for an operation to access a shared resource, according to an embodiment of the invention.

FIG. 2 depicts a flowchart of example processing for an operation to access a shared resource, according to an embodiment of the invention. Control begins at block 200. Control then continues to block 205 where a partition 134 submits an operation for a shared resource to hypervisor 136. In various embodiments, the operation may be a request to read from, write to, update, delete, or configure the shared resource or any portion, subset, multiple, or combination thereof. Control then continues to block 210 where, in response to receiving the operation, the hypervisor 136 determines whether the operations submitted by the partition 134 are throttled (i.e., whether the partition has a throttle rate or a throttle amount). If the determination at block 210 is true, then the partition that submitted the operation is throttled and has a throttle amount, so control continues to block 215 where the hypervisor 136 determines whether the number of operations successfully submitted (the shared resource was not busy when the operation was submitted) by the partition to the shared resource (or to all shared resources) during the current time subdivision of the current time period is less than the throttle amount assigned to the partition for the shared resources (or for all shared resources) for the current time subdivision of the current time period.

If the determination at block 215 is true, then the number of operations submitted by the partition to the shared resource (or to all shared resources) during the current time subdivision of the current time period is less than the throttle amount assigned to the partition 134 for the shared resource (or for all shared resources) for the current time subdivision, so control continues to block 220 where the hypervisor 136 submits the operation to the shared resource. Control then continues to block 225 where the hypervisor 136 determines whether the shared resource is busy and not able to perform the operation. If the determination at block 225 is true, then the shared resource is busy and not able to perform the operation, so control continues to block 230 where the hypervisor 136 returns a busy status or return code to the partition that submitted the operation and records or saves to the memory 102 an indication that the partition received a busy status during the current time period. Control then returns to block 205, where the same or a different partition submits the same or a different operation to the same or a different shared resource via the hypervisor 136 during the same time period. In this way, multiple partitions 134 may submit operations to the same shared resource.

If the determination at block 225 is false, then the shared resource is not busy and is able to accept and perform the operation, so control continues to block 235 where the hypervisor 136 records or saves an indication of success to the memory 102 for the partition in the current time period. The shared resource performs the operation, and the hypervisor 136 returns an indication or return code of success to the partition. Control then returns to block 205, as previously described above. If the determination at block 215 is false, then the number of operations submitted by the partition to the shared resource (or to all shared resources) during the current time subdivision of the current time period is greater than or equal to the throttle amount assigned to the partition for the shared resource (or for all shared resources) for the current time subdivision in the current time period, so control continues to block 240 where the hypervisor 136 does not submit the operation to the shared resource. Control then continues to block 230, as previously described above.

If the determination at block 210 is false, then the partition that submitted the operation is not throttled (does not have a throttle amount), so control continues to block 245 where the hypervisor 136 submits the operation to the shared resource and records a return code returned by the shared resource (the return code may specify, for example, whether or not the shared resource performed the operation successfully, did not perform the operation successfully, or was busy and was unable to accept the operation) for the partition and the shared resource to the memory 102. The hypervisor 136 returns the recorded return code to the partition that submitted the operation. Control then returns to block 205, as previously described above.

Figure 3:
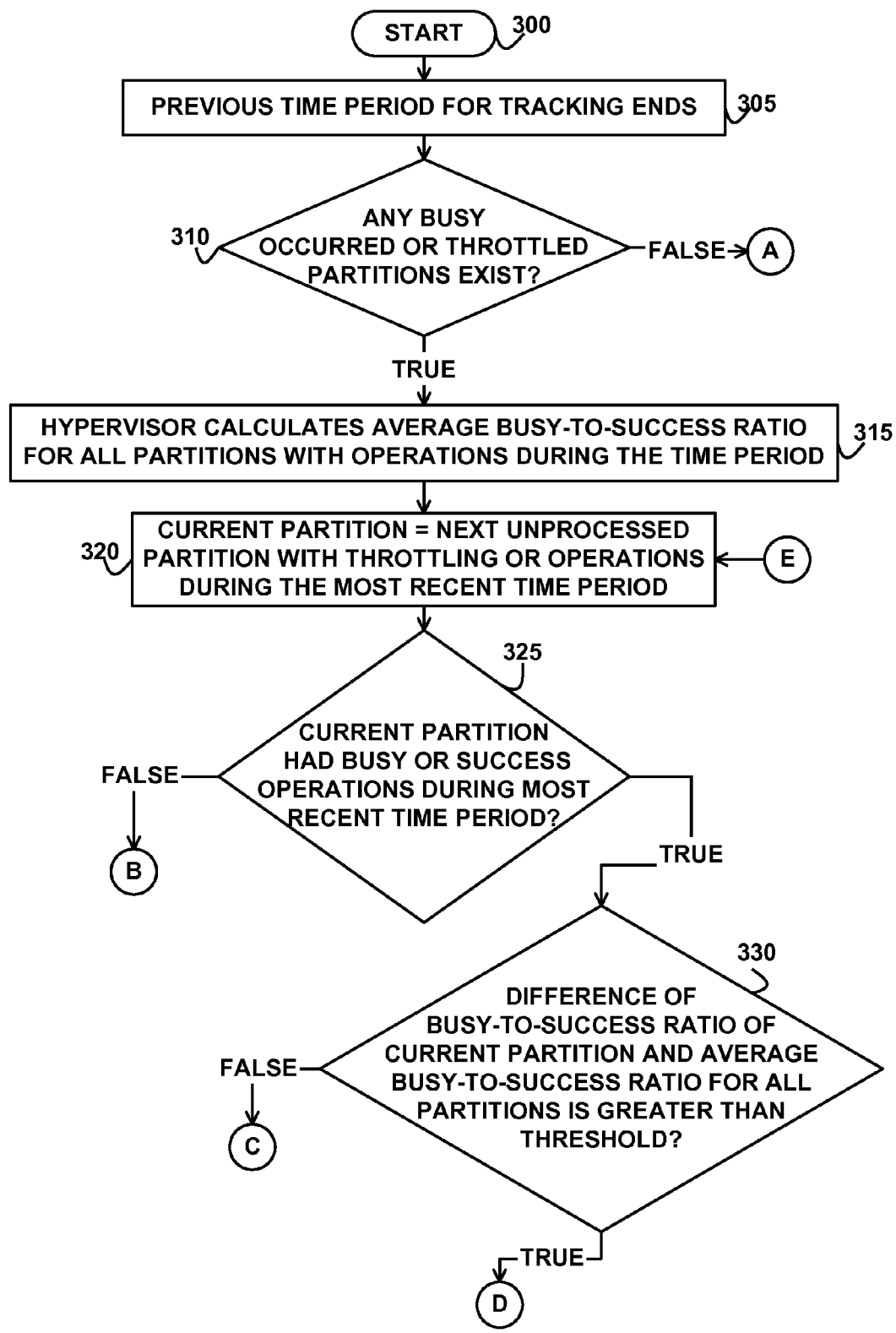
FIG. 3 depicts a flowchart of example processing for throttling the access of shared resources by partitions after the expiration of a time period for tracking, according to an embodiment of the invention.
Figure 4:
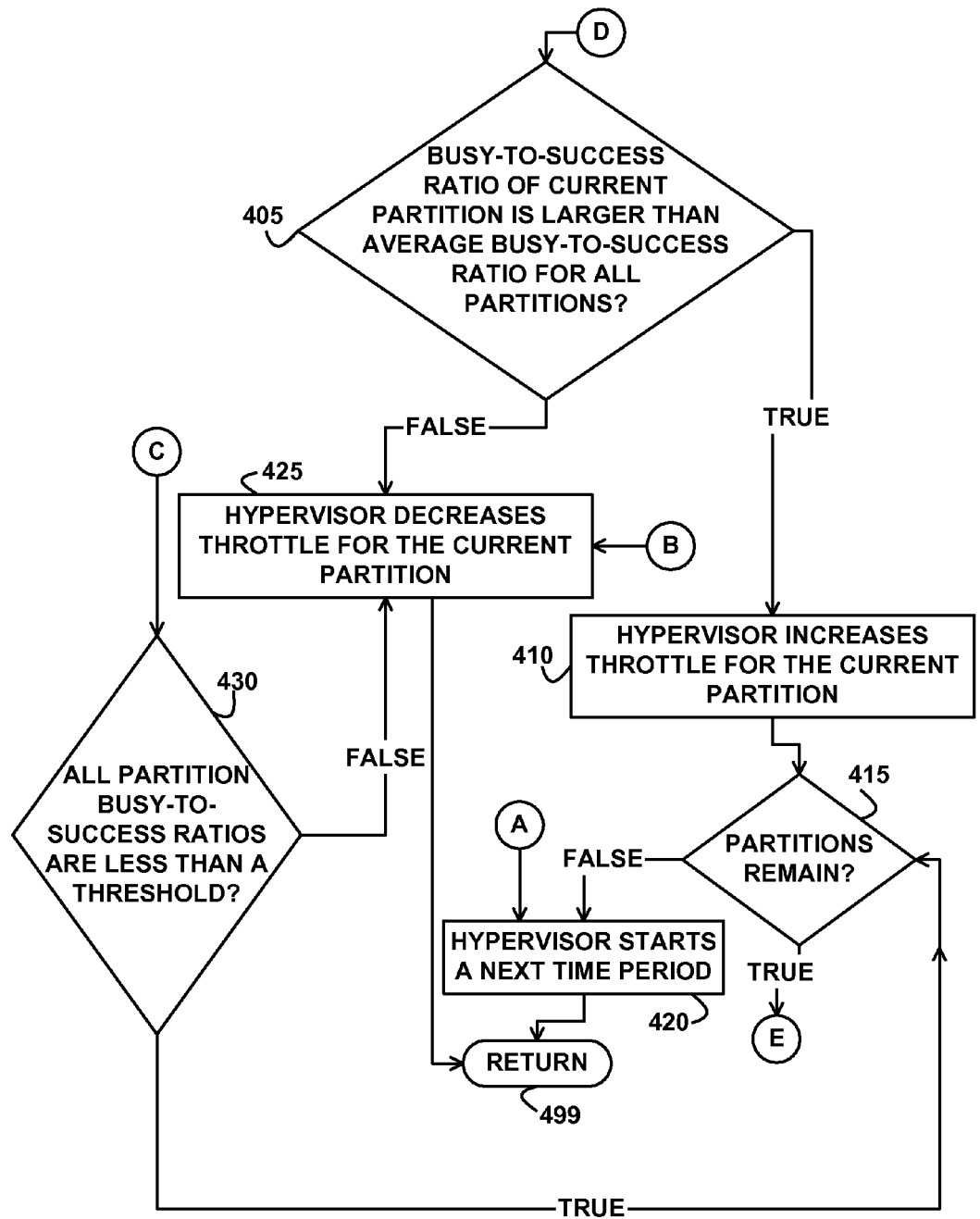
FIG. 4 depicts a flowchart of further example processing for throttling the access of shared resources by partitions after the expiration of a time period for tracking, according to an embodiment of the invention.

FIGS. 3 and 4 depict flowcharts of example processing for throttling the access of shared resources by partitions after the expiration of a time period for tracking, according to an embodiment of the invention. Control begins at block 300. Control then continues to block 305 where the hypervisor 136 detects that the time period for the tracking expires, lapses, or ends, for example by expiration of the timer 172. Control then continues to block 310 where the hypervisor 136 determines whether any busy records for any partition exist (e.g., created as previously described above with reference to blocks 230 and 245 of FIG. 2), which indicate the hypervisor 136 returned a busy return code to the recorded partition during the previous time period that ended at block 305, and the operation requested by the partition was not sent to the shared resource or whether any throttled partitions exist (whether any partition had a throttle amount during the previous time period that ended).

If the determination at block 310 is true, then at least one partition received a busy return code during the previous time period or at least one partition had a throttle amount during the previous time period, so control continues to block 315 where the hypervisor 136 calculates an average busy-to-success ratio for all partitions 134 that submitted operations to the hypervisor 136 for any shared resource during the previous (most recent) time period that ended. In an embodiment, the hypervisor 136 performs the calculation by calculating a busy-to-success ratio for reach partition by dividing, for each partition, the number of operations the partition submitted to the hypervisor 136 for any shared resource for which the hypervisor 136 sent a busy return code to the partition by the number of operations the partition submitted to the hypervisor 136 for which the hypervisor 136 sent a successful return code to the partition. The hypervisor 136 then sums the busy-to-success ratio of all partitions 134 that submitted operations to the shared resource and divides the sum by the total number of partitions 134 that submitted operations to any shared resource.

Control then continues to block 320 where the hypervisor 136 sets the current partition to be the next unprocessed partition (unprocessed by the loop of the logic of FIGS. 3 and 4 that starts at block 320) that had a throttle amount during the previous time period or the next unprocessed partition that submitted operations to any shared resource during the previous (most recent) time period, which ended at block 305. Control then continues to block 325 where the hypervisor 136 determines whether the current partition submitted any operations (either operations that received a busy return code or operations that received a successful return code) to any shared resource during the previous (most recent) time period, which ended at block 305. If the determination at block 325 is true, then the current partition submitted at least one operation (either an operation that received a busy return code or an operation that received a successful return code) to any shared resource during the previous (most recent) time period, so control continues to block 330 where the hypervisor 136 determines whether the difference between the busy-to-success ratio of the current partition and the average busy-to-success ratio for all partitions 134 is greater than a threshold.

If the determination at block 330 is true, then the difference between the busy-to-success ratio of the current partition and the average busy-to-success ratio for all partitions 134 is greater than the threshold, so control continues to block 405 of FIG. 4 where the hypervisor 136 determines whether the busy-to-success ratio of the current partition is larger than the average busy-to-success ratio for all partitions 134.

If the determination at block 405 is true, then the busy-to-success ratio of the current partition is larger than the average busy-to-success ratio for all partitions 134, so control continues to block 410 where the hypervisor 136 increases the throttle amount for the current partition. The throttle amount is the number of operations for a particular partition that the hypervisor 136 allows a partition 134 to submit to a shared resource during the next time period. In an embodiment, the hypervisor 136 divides the throttle amount by the number of time subdivisions in a time period, to obtain a throttle amount for each time subdivision within a time period. Control then continues to block 415 where the hypervisor 136 determines whether any partitions 134 remain that are unprocessed by the logic loop that starts at block 320 of FIG. 3. If the determination at block 415 is true, then at least one unprocessed partition remains, so control returns to block 320 at FIG. 3 where the hypervisor 136 begins processing the next unprocessed partition, as previously described above.

If the determination at block 415 is false, then all partitions 134 have been processed by the logic loop that starts at block 320 of FIG. 3, so control continues to block 420 where the hypervisor 136 starts a next time period. In an embodiment, the hypervisor resets the timer 172 to start a new (next) time period, which is a different time period than the previous time period that lapsed or ended at block 305. In an embodiment, the logic of FIG. 2 executes during the previous time period that lapsed or ended at block 305. In an embodiment, the logic of FIG. 2 executes during the next time period that starts at block 420. In an embodiment, different instances of the logic of FIG. 2 execute in both the previous and the next time period. Control then continues to block 499 where the logic of FIGS. 3 and 4 returns.

If the determination at block 405 of FIG. 4 is false, then the busy-to-success ratio of the current partition is less than or equal to the average busy-to-success ratio for all partitions 134, so control continues to block 425 where the hypervisor 136 decreases the throttle amount for the current partition. Control then continues to block 499 where the logic of FIGS. 3 and 4 returns.

If the determination at block 330 of FIG. 3 is false, then the difference between the busy-to-success ratio of the current partition and the average busy-to-success ratio for all partitions 134 is less than or equal to the threshold, so control continues to block 430 of FIG. 4 where the hypervisor 136 determines whether all busy-to-success ratios of all partitions 134 are less than a threshold. If the determination at block 430 is true, then all busy-to-success ratios of all partitions 134 are less than a threshold, so control continues to block 415, as previously described above.

If the determination at block 430 of FIG. 4 is false, then at least one busy-to-success ratio of at least one partition 134 is greater than or equal to a threshold, so control continues to block 425, where the hypervisor 136 reduces the throttle amount for the current partition. Control then continues to block 499 where the logic of FIGS. 3 and 4 returns.

If the determination at block 325 of FIG. 3 is false, then the current partition did not submit any operations to any shared resource during the most recent time period, so control continues to block 425 where the hypervisor 136 reduces the throttle amount for the current partition. Control then continues to block 499 where the logic of FIGS. 3 and 4 returns.

If the determination at block 310 is false, then no partition received a busy return code during the previous time period and no partition had a throttle amount during the previous time period, so control continues to block 420 of FIG. 4 where the hypervisor 136 sets the timer 172 to start a next time period. Control then continues to block 499 where the logic of FIGS. 3 and 4 returns.

Figure 5:
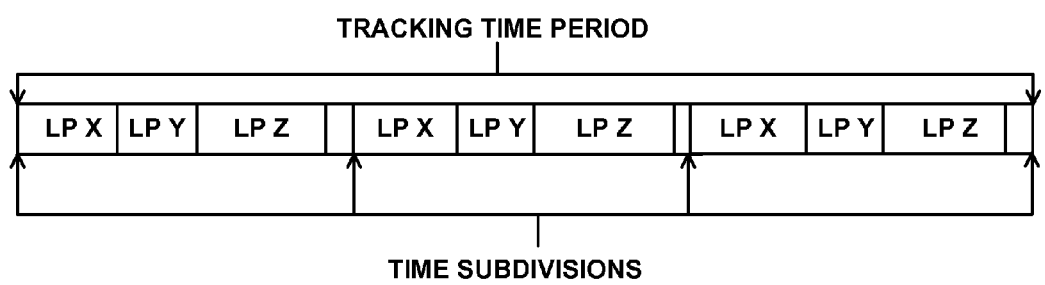
FIG. 5 depicts a block diagram of allowed attempted operations during a tracking time period, which is divided into time subdivisions, according to an embodiment of the invention.

FIG. 5 depicts a block diagram of allowed attempted operations during a tracking time period, which is divided into time subdivisions, according to an embodiment of the invention. In the example illustrated in FIG. 5, the partitions LP X, LP Y, and LP Z all have a number of allowed attempts at operations to a shared resource in a time subdivision based on their throttle amount and previous usage of the shared resource. In this example, the partition LP Y is allowed less successes than the partitions LP x and LP Z due to the higher throttle amount of the partition LP Y.

In this way, in an embodiment, some or all of the partitions 134 may have different throttle amounts based on usage of a shared resource, which improves fairness of access to shared resources.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense.

What is claimed is:

1. A non-transitory computer-readable storage medium encoded with instructions, wherein the instructions when executed comprise:
   calculating a first busy-to-success ratio for a first partition of a plurality of partitions during a first time period;
   calculating an average busy-to-success ratio for the plurality of partitions that submitted a plurality of operations to a shared resource during the first time period;
   if the first busy-to-success ratio for the first partition is greater than the average busy-to-success ratio for the plurality of partitions and a difference between the first busy-to-success ratio for the first partition and the average busy-to-success ratio for the plurality of partitions is greater than a threshold amount, increasing a throttle amount for the first partition, wherein all the plurality of partitions have different throttle amounts;
   receiving a first operation from the first partition during a first time subdivision of a second time period, wherein the second time period is after the first time period;
   if a number of successful operations received from the first partition up to the receiving during the first time subdivision of the second time period is greater than the throttle amount for the first partition during the first time subdivision of the second time period, returning a busy indication to the first partition and refraining from submitting the first operation to the shared resource; and
   if a number of successful operations received from the first partition up to the receiving during the first time subdivision of the second time period is less than the throttle amount for the first partition during the first time subdivision of the second time period, submitting the first operation to the shared resource.

2. The non-transitory computer-readable storage medium of claim 1, further comprising:
   if the first partition did not submit any operation to the shared resource during the first time period, decreasing the throttle amount for the first partition.

3. The non-transitory computer-readable storage medium of claim 1, further comprising:
   if the first busy-to-success ratio for the first partition is less than the average busy-to-success ratio for the plurality of partitions and a difference between the average busy-to-success ratio for the plurality of partitions and the first busy-to-success ratio for the first partition is greater than a threshold amount, decreasing a throttle amount for the first partition.

4. The non-transitory computer-readable storage medium of claim 1, further comprising:
   calculating the throttle amount for time subdivisions of the second time period, wherein the calculating the throttle amount for the time subdivisions further comprises dividing the throttle amount by a number of time subdivisions in the second time period.

5. The non-transitory computer-readable storage medium of claim 1, wherein the calculating the average busy-to-success ratio for the plurality of partitions that submitted the plurality of operations to the shared resource during the first time period further comprises:
   summing respective busy-to-success ratios for all of the plurality of partitions and dividing a result of the summing by a number of the plurality of partitions, wherein the summing further comprises calculating for each of the plurality of partitions a number of times that the shared resource does not accept operations from each of the plurality of partitions divided by a number of times that the shared resource accepts the operations from each of the plurality of partitions.

6. The non-transitory computer-readable storage medium of claim 1, wherein the calculating the first busy-to-success ratio for the first partition of the plurality of partitions during the time first period further comprises:
   calculating a number of times that the shared resource does not accept operations from the first partition during the first time period divided by a number of times that the shared resource accepts the operations from the first partition during the first time period.

7. The non-transitory computer-readable storage medium of claim 1, wherein if the shared resource performs the operation and the operation is successful then the shared resource returns a successful return code and wherein if the shared resource is unable to perform the operation, then the shared resource is busy.

8. A computer system comprising:
   a processor; and
   memory communicatively coupled to the processor, wherein the memory is encoded with instructions, wherein the instructions when executed by the processor comprise
   calculating a first busy-to-success ratio for a first partition of a plurality of partitions during a first time period,
   calculating an average busy-to-success ratio for the plurality of partitions that submitted a plurality of operations to a shared resource during the first time period,
   if the first busy-to-success ratio for the first partition is greater than the average busy-to-success ratio for the plurality of partitions and a difference between the first busy-to-success ratio for the first partition and the average busy-to-success ratio for the plurality of partitions is greater than a threshold amount, increasing a throttle amount for the first partition, wherein all the plurality of partitions have different throttle amounts,
   receiving a first operation from the first partition during a first time subdivision of a second time period, wherein the second time period is after the first time period,
   if a number of successful operations received from the first partition up to the receiving during the first time subdivision of the second time period is greater than the throttle amount for the first partition during the first time subdivision of the second time period, returning a busy indication to the first partition and refraining from submitting the first operation to the shared resource,
   if a number of successful operations received from the first partition up to the receiving during the first time subdivision of the second time period is less than the throttle amount for the first partition during the first time subdivision of the second time period, submitting the first operation to the shared resource, and
   if the first partition did not submit any operation to the shared resource during the first time period, decreasing the throttle amount for the first partition.

9. The computer system of claim 8, wherein the instructions further comprise:
   if the first busy-to-success ratio for the first partition is less than the average busy-to-success ratio for the plurality of partitions and a difference between the average busy-to-success ratio for the plurality of partitions and the first busy-to-success ratio for the first partition is greater than a threshold amount, decreasing a throttle amount for the first partition.

10. The computer system of claim 8, wherein the instructions further comprise:
    calculating the throttle amount for time subdivisions of the second time period, wherein the calculating the throttle amount for the time subdivisions further comprises dividing the throttle amount by a number of time subdivisions in the second time period.

11. The computer system of claim 8, wherein the calculating an average busy-to-success ratio for a plurality of partitions that submitted a plurality of operations to a shared resource during a first time period further comprises:
    summing respective busy-to-success ratios for all of the plurality of partitions and dividing a result of the summing by a number of the plurality of partitions, wherein the summing further comprises calculating for each of the plurality of partitions a number of times that the shared resource does not accept operations from each of the plurality of partitions divided by a number of times that the shared resource accepts the operations from each of the plurality of partitions.

12. The computer system of claim 8, wherein the calculating the first busy-to-success ratio for the first partition of the plurality of partitions during the time first period further comprises:
    calculating a number of times that the shared resource does not accept operations from the first partition during the first time period divided by a number of times that the shared resource accepts the operations from the first partition during the first time period.

13. The computer system of claim 8, wherein if the shared resource performs the operation and the operation is successful then the shared resource returns a successful return code and wherein if the shared resource is unable to perform the operation, then the shared resource is busy.

* * * * *